(No Model.)
H. J. DOUGHTY.
PNEUMATIC TIRE.
No. 558,162.   Patented Apr. 14, 1896.
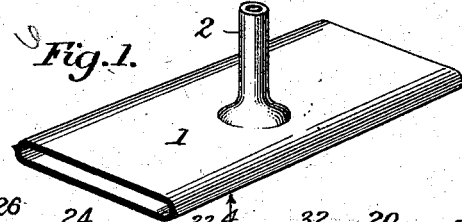
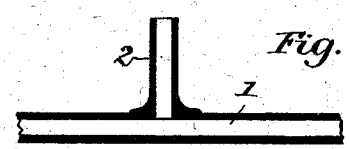
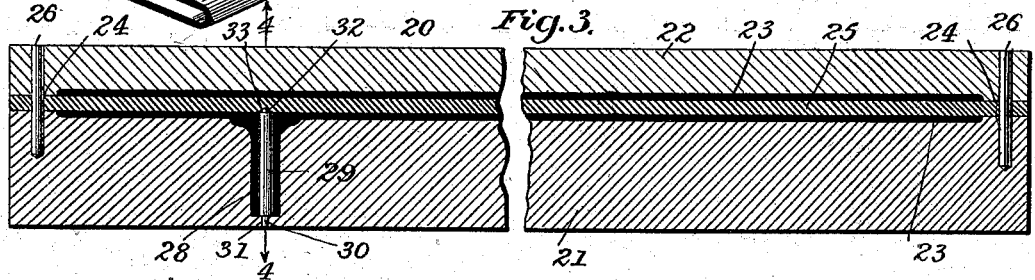
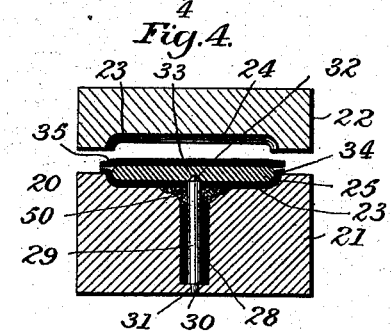
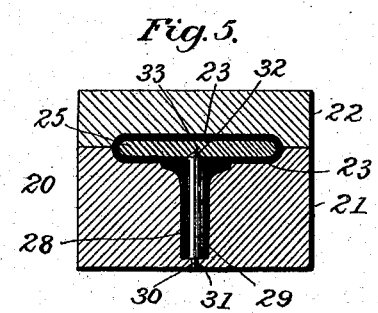
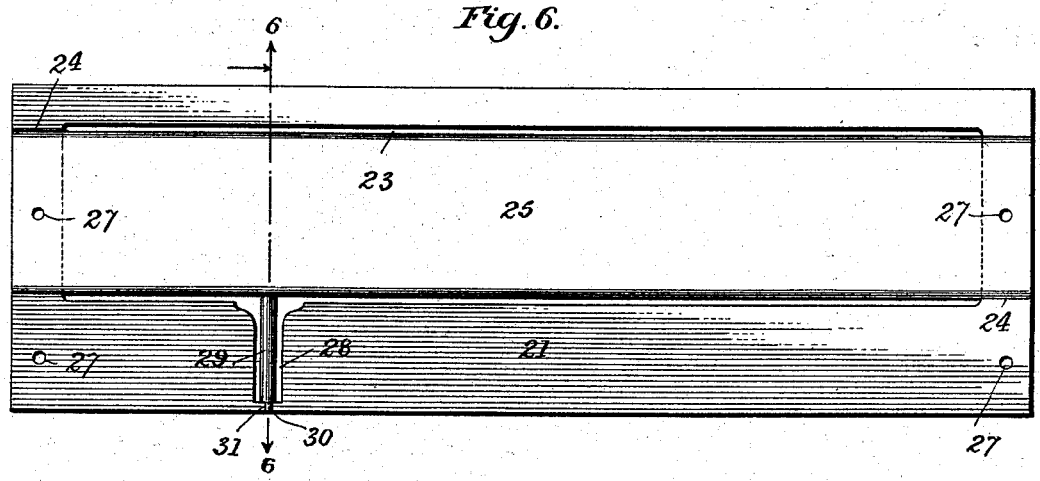
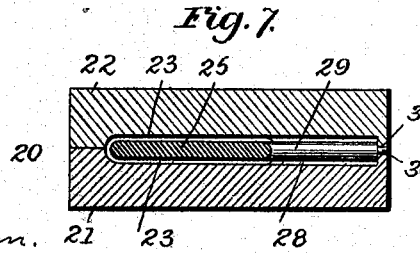
Witnesses   Inventor
Henry J. Doughty,
by his Attorneys

UNITED STATES PATENT OFFICE.

HENRY J. DOUGHTY, OF PROVIDENCE, RHODE ISLAND.

PNEUMATIC TIRE.

SPECIFICATION forming part of Letters Patent No. 558,162, dated April 14, 1896.

Application filed May 23, 1895. Serial No. 550,421. (No model.)

*To all whom it may concern:*

Be it known that I, HENRY J. DOUGHTY, a citizen of the United States, residing at Providence, in the county of Providence and State of Rhode Island, have invented certain new and useful Improvements in Pneumatic Tires, of which the following is a specification.

My invention is an improvement in pneumatic tires, and relates more particularly to the inner separable tubes thereof and to the novel method by which such tubes are made.

The objects of the invention are, first, to generally improve inflatable tubes of the kind indicated and to make them in one integral piece with the usual nipple for the reception of the inflation-valve, instead of, as heretofore, making the tube and nipple separately and thereafter joining them together, and, second, to provide an improved method of molding such tubes, so that they may be produced in an expeditious manner by simple means and at a comparatively small cost.

In the accompanying drawings, Figure 1 is a perspective view of a portion of my improved inflatable tube with the nipple formed thereon. Fig. 2 is a longitudinal central section thereof. Fig. 3 is a longitudinal section of one form of mold used in the manufacture of my improved air-tube. Fig. 4 is a cross-section of the mold on the line 4 4 of Fig. 3, showing the upper mold-section lifted and the strips of sheeted rubber on opposite sides of the mandrel preparatory to being formed into a tube. Fig. 5 is a similar view after the mold-sections have been brought together to form the tube. Fig. 6 is a plan view of one section of a mold of a somewhat different form, and Fig. 7 is a cross-section on the line 6 6 of Fig. 6.

Heretofore in the manufacture of air-tubes for pneumatic tires, so far as known to me, it has been customary to wrap upon a mandrel or former of suitable size and shape a sheet of prepared rubber made to completely inclose the mandrel, with the edges of the sheet at one side thereof. These edges were then usually cut as required to bring them together with more or less nicety, were suitably joined, and thereafter they were rolled down as smooth as possible to insure a good even seam. The mandrel, with the rubber thus applied to it, was then tightly wrapped with several thicknesses of wet cloth to compress the rubber thereon and aid in the formation of the tube, and was finally placed in a vulcanizer and subjected to heat to vulcanize and complete the formation of the tube, in a manner well understood. After removal from the vulcanizer the tube was stripped from the mandrel, and the air-valve nipple, which had been separately formed, was then cemented or otherwise secured to the tube. The process thus practiced required more or less skill to insure success, was comparatively slow because of the care necessary in the application and arrangement of the material upon the mandrel and the separate formation of the nipple and its subsequent connection with the tube, and the tubes produced were correspondingly expensive.

According to my invention the improved air-tube is made of comparatively pure rubber, as usual with tubes of this kind, and in the preferred form (illustrated in Figs. 1 and 2) it consists of a generally-flattened body portion 1, with a cylindrical nipple 2 for the reception of the ordinary inflation-valve.

The tube and nipple are molded at one and the same operation and in one integral piece. In making the tube I take pieces or strips of prepared sheet-rubber and bring their edges together and connect the same. To this end I may use different means; but as shown in Figs. 3, 4, and 5 I employ a mold 20, which consists of two separable sections 21 22, each having a shallow elongated recess 23 of suitable size and shape at its inner face, so that when the two sections are properly brought together the walls of said recesses will form a closed molding-chamber equally divided between the sections. This molding-chamber is of a length about equal to that of the tube to be produced, and the end walls of the recess 23 in each mold-section have recesses 24 to form bearings for the ends of a substantially flat mandrel 25, which is thus supported within the molding-chamber when the sections are in contact, leaving a space (shown as of uniform size) on all sides of the mandrel within said chamber. The lower mold-section 21 in said figures is provided with a recess 28, corresponding to the external form of the desired valve-nipple, and this recess may be at a right angle to the main chamber and is preferably located near one end thereof. As shown, the upper end of this recess 28 is flared out somewhat or bell-shaped where it communicates with the tire-molding chamber, and centrally within the recess extends a part of the mandrel in the form of a pin 29, the lower end 30 of which is shown as reduced in size and detachably inserted in an opening 31 in the lower part of the mold-section, while the upper end 32 of the pin is conical and projects slightly into a corresponding recess 33 in the under side of the mandrel 25.

The mold shown in Figs. 6 and 7 is of substantially the same construction as the mold illustrated in the figures just described, except that in this instance the pin 29 extends from and is preferably formed on one edge of the mandrel 25, while the opposing faces of the mold-sections 21 22 are provided with lateral recesses to receive the pin between them and form the recess 28 round the pin when the sections are brought together.

To insure the proper relation of the mold-sections and of the mandrel when the mold is closed, one of the mold-sections is provided with dowel-pins 26, adapted to enter openings 27 in the mandrel and other mold-section as the parts are brought together.

In the process of making the tube and its nipple in the mold, (shown more particularly in Figs. 3, 4, and 5,) the mold is preferably first heated, as usual, and the sections are then separated and the mandrel and pin 29 removed. The pin is then wrapped with sheet-rubber and cloth sufficient to completely inclose it and is introduced into the recess 28 with its end 30 seated in the opening 31, the wrapping on the pin being such as to permit its easy entrance into the recess, and after the pin is in proper position a small quantity of soft rubber 50, Fig. 4, is usually placed around its upper end to completely fill up all unoccupied space which may be left at that point. A strip or piece 34 of prepared sheet-rubber or composition of the desired length and thickness is then laid in the recess of the lower mold-section 21 and over the upper end of the pin 29. The mandrel 25 is next put in place above the said rubber strip with its ends supported at the bearings 24 24, so that the mandrel will not by its own weight squeeze out the rubber beneath. A second strip or piece 35 of sheet-rubber is now spread over the upper side of the mandrel and preferably so arranged that its edges will overlie or be in contact with the edges of the sheet below the mandrel, and the upper mold-section 22 is then adjusted to position and closed down upon the lower section. The material being thus arranged in the mold, the latter is finally put in a suitable press and subjected to sufficient pressure to bring the mold-sections forcibly together to unite the strips 34 35 at the edges into a practically homogeneous mass and thus shape and complete the formation of the body of the tube, while also simultaneously forming the valve-nipple around the pin 29 and in one piece with the tube. As the mold-sections are forced together the upper conical end of the pin 29 pierces the overlying sheet 34 of rubber and enters the recess 33 in the under side of the mandrel, thus centering the pin within the recess 28 and at the same time forming a communicating passage between the nipple and tube.

In the use of the mold shown in Figs. 6 and 7 the process of making the tube is the same as that already described, except that, as in this instance the pin 29 projects laterally from the edge of the mandrel, the pin need not necessarily be separately wrapped, and the sheets of rubber may be so shaped at one side as to cover or inclose the pin when in position in the mold. When the sections of this form of mold are brought together under pressure, the sheets of rubber are united around the pin to form the nipple in the same manner as the body of the tube is formed on the mandrel. If preferred, however, the pin may be first wrapped, as before, or separate pieces of rubber may be placed on opposite sides of it; but in any case the nipple is formed simultaneously with and as an integral part of the tube.

Any surplus rubber in the mold is forced out through the joints between the sections thereof and forms thin lips or fins at the opposite sides of the finished tube, and these fins are subsequently trimmed off in any suitable way.

The mold, after remaining in the heated press a sufficient length of time for the rubber to vulcanize therein, is removed and opened and the rubber tube stripped from the mandrel, and where the pin 29 is an independent part it may, if desired, be first withdrawn from the nipple. In case the pin is fixed to the mandrel, as in Figs. 6 and 7, the elasticity of the rubber will permit the ready removal of the tube, especially as the pin is usually located near the end of the mandrel. After removal the tube is closed at the ends or formed into a complete ring, according to the character of tire required, and is then ready for use.

I propose in some instances to use molds provided with a series of separate molding-chambers of the character described and arranged side by side in the mold, so as to produce at one and the same operation a series of tubes and their nipples. In the use of this form of mold a sheet of rubber of proper size to cover all the molding-chambers is spread over the lower mold-section, whereupon the mandrels are placed in position above this sheet. A second sheet of rubber of like size is then spread over the mandrels, and thereafter the upper mold-section is put in place and the mold subjected to heat and pressure as before. In this way a number of tubes may be made at one operation and at practically no greater expense for time and labor than is involved in the making of a single tube. The tubes thus formed in series are all joined together by thin webs of rubber when first taken from the mold and may be readily stripped from the mandrels and cut apart and trimmed as required.

It will be seen that the method of making the tube in the manner set forth is exceedingly simple, requiring no special skill or care in the arrangement of the material in the mold, and that the tubes, with their nipples formed in one therewith, may accordingly be produced with rapidity and at comparatively small cost.

Although I have shown and described the mandrel as being flat in cross-section and the molding-chamber shaped to conform thereto, it will, of course, be apparent that the mandrel and mold-chamber may be round or otherwise suitably shaped, if preferred. It will also be seen that although the strips of rubber for the body of the tube are shown as of equal width, with their edges abutting or overlapping at the opposite sides of the mandrel, they may, if desired, be of different widths and so arranged that one strip will encircle or cover more of the mandrel than the other.

What I claim is—

1. An air-tube for a pneumatic tire, consisting of a body portion and a valve-nipple formed in one integral piece, said nipple extending laterally from the side of said body portion between its ends, substantially as described.

2. The within-described improvement in making rubber air-tubes with nipples, for pneumatic tires, consisting in pressing together and uniting the edges of separate sheets or strips of rubber to form the body of the tube, and simultaneously forming thereon a valve-nipple, and vulcanizing the whole, substantially as set forth.

3. The within-described improvement in making air-tubes with nipples for pneumatic tires, consisting in bringing together under pressure the edges of two sheets of rubber upon opposite sides of a mandrel having one part corresponding to the interior of the tube, and another part to the interior of the nipple, substantially as described.

4. A mold for air-tubes and nipples of pneumatic tires, consisting of sections with recesses corresponding to the outer form of the tube and nipple, and a mandrel corresponding to the inner form of the tube and nipple, substantially as described.

In testimony whereof I have signed my name to this specification in the presence of two subscribing witnesses.

HENRY J. DOUGHTY.

Witnesses:
ROSE A. CALLAN,
ROBERT L. WALKER.